(12) United States Patent  (10) Patent No.: US 7,478,824 B2
Buerkle et al.  (45) Date of Patent: Jan. 20, 2009

(54) DRAWBAR HAMMER STRAP ASSEMBLY WITH PIN TRIGGER

(75) Inventors: Bryan Kirk Buerkle, Waterloo, IA (US); Michael Dean Kollath, Dunkerton, IA (US)

(73) Assignee: Deere & Company, Moline, IL (US)

( * ) Notice: Subject to any disclaimer, the term of this patent is extended or adjusted under 35 U.S.C. 154(b) by 182 days.

(21) Appl. No.: 11/523,850

(22) Filed: Sep. 20, 2006

(65) Prior Publication Data

US 2008/0067785 A1   Mar. 20, 2008

(51) Int. Cl.
     *B60D 1/02*   (2006.01)
(52) U.S. Cl. ........................ 280/515; 280/507
(58) Field of Classification Search ......... 280/515, 280/507
     See application file for complete search history.

(56) References Cited

U.S. PATENT DOCUMENTS

| 1,448,950 | A | * | 3/1923 | Uecker ........................ 280/508 |
| 2,522,215 | A | | 9/1950 | Du Shane |
| 2,525,471 | A | * | 10/1950 | Balzer ........................ 280/508 |
| 2,654,613 | A | | 10/1953 | Blair et al. |
| 2,818,276 | A | | 12/1957 | Sprang |
| 3,926,456 | A | | 12/1975 | Lundebrek |
| 5,769,559 | A | * | 6/1998 | Olson ........................ 403/322.1 |
| 5,921,699 | A | * | 7/1999 | Olson ........................ 403/322.1 |
| 6,758,486 | B1 | * | 7/2004 | Kollath ........................ 280/515 |
| 7,398,987 | B2 | * | 7/2008 | Roe et al. ........................ 280/515 |
| 7,416,206 | B2 | * | 8/2008 | Buerkle ........................ 280/515 |
| 2007/0290484 | A1 | * | 12/2007 | Buerkle ........................ 280/515 |
| 2008/0100034 | A1 | * | 5/2008 | Maillet ........................ 280/515 |

OTHER PUBLICATIONS

John Deere Parts Catalog 9425 Section 70 p. 58 Drawbar Hammer Strap; 1 page Printed Dec. 12, 2005.
John Deere Parts Catalog 9451 Section 70 p. 66 Drawbar Clevis (North American Version) 1 page Printed Dec. 12, 2005.
John Deere Parts Catalog 2852 Section 70 p. 116 Heavy Duty Drawbar Support Kit; 1 page Printed Dec. 12, 2005.
ISO/FDIS 6489 PTO Drive Shaft Clearance Drawing; 2003 p. 6; 1 page.

* cited by examiner

*Primary Examiner*—Paul N Dickson
*Assistant Examiner*—Patrick Centolanzi

(57) ABSTRACT

A vehicle drawbar hammer strap assembly may be coupled to an implement tongue with a drawbar pin. A cross pin with a lever arm is operable to releasably hold the drawbar pin. A trigger is engageable with the tongue and the cross pin, and is pivotal from a latched position wherein it engages the cross pin and holds the cross pin in its locked position to an unlatched position wherein it is spaced apart from the cross pin. The tongue engages the trigger and pivot the trigger in an over-center manner from its latched to its unlatched position. The trigger includes a latch member attached to a wire form part which is pivotally coupled to the hammer strap. The latch member is engageable with the lever arm and with an end of the tongue.

14 Claims, 4 Drawing Sheets

DRAWBAR HAMMER STRAP ASSEMBLY WITH PIN TRIGGER

BACKGROUND

The present invention relates to a drawbar hammer strap for coupling a towed implement to a tractor drawbar.

Typically, a hammer strap is mounted on a tractor drawbar, and a towed implement can be coupled to the drawbar with a drawbar or hammer strap pin which passes through the hammer strap and the implement tongue. Preferably, such a hammer strap should have a low profile in order to accommodate power-take-off (PTO) operated equipment using the drawbar while operating over uneven terrain. A hammer strap which extends too high may contact the PTO. The drawbar pin should remain vertically fixed despite vertical movement as motion of the implement and drawbar. The drawbar pin also must resist rotational movement so as not to cause excessive wear to the tongue and/or hammer strap. The drawbar pin must be secured in it's working position.

SUMMARY

Accordingly, an object of this invention is to provide a drawbar hammer strap assembly which has a low profile and sufficient PTO clearance.

A further object of the invention is to provide such a drawbar hammer strap assembly which can hold a drawbar cross pin in a locked position.

A further object of the invention is to provide such a drawbar hammer strap assembly which can prevent rotation of drawbar pin.

These and other objects are achieved by the present invention, wherein a drawbar hammer strap assembly includes a drawbar, a hammer strap member attached to the drawbar, a drawbar pin mountable to drawbar and hammer strap member and a cross pin rotatably mounted in the hammer strap for releasably holding the drawbar pin in its mounted position. A trigger is pivotally coupled to the hammer strap member. The trigger is engagable with the implement tongue and the cross pin. The trigger is pivotal from a latched position wherein it engages the cross pin and holds the cross pin in its locked position to an unlatched position wherein it is spaced apart from the cross pin. The trigger includes a latch member attached to a wire form part which is pivotally coupled to the hammer strap. The latch member is engagable with the lever arm and with an end of the tongue.

DETAILED DESCRIPTION

Figure 1:
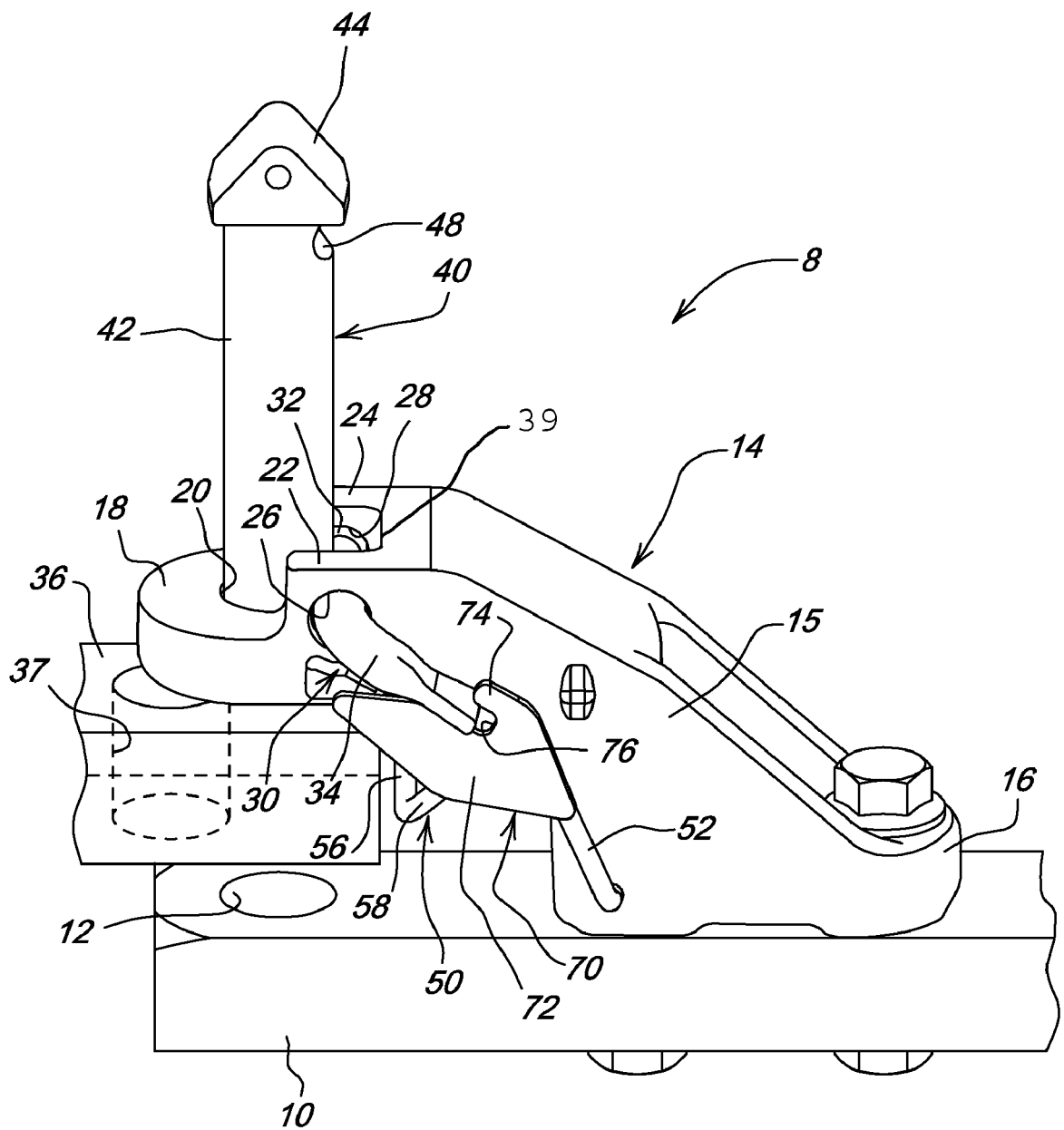
FIG. 1 is a perspective left side view of a drawbar hammer strap assembly embodying the invention showing the trigger in its latched position and showing the implement tongue starting to engage the trigger.
Figure 2:
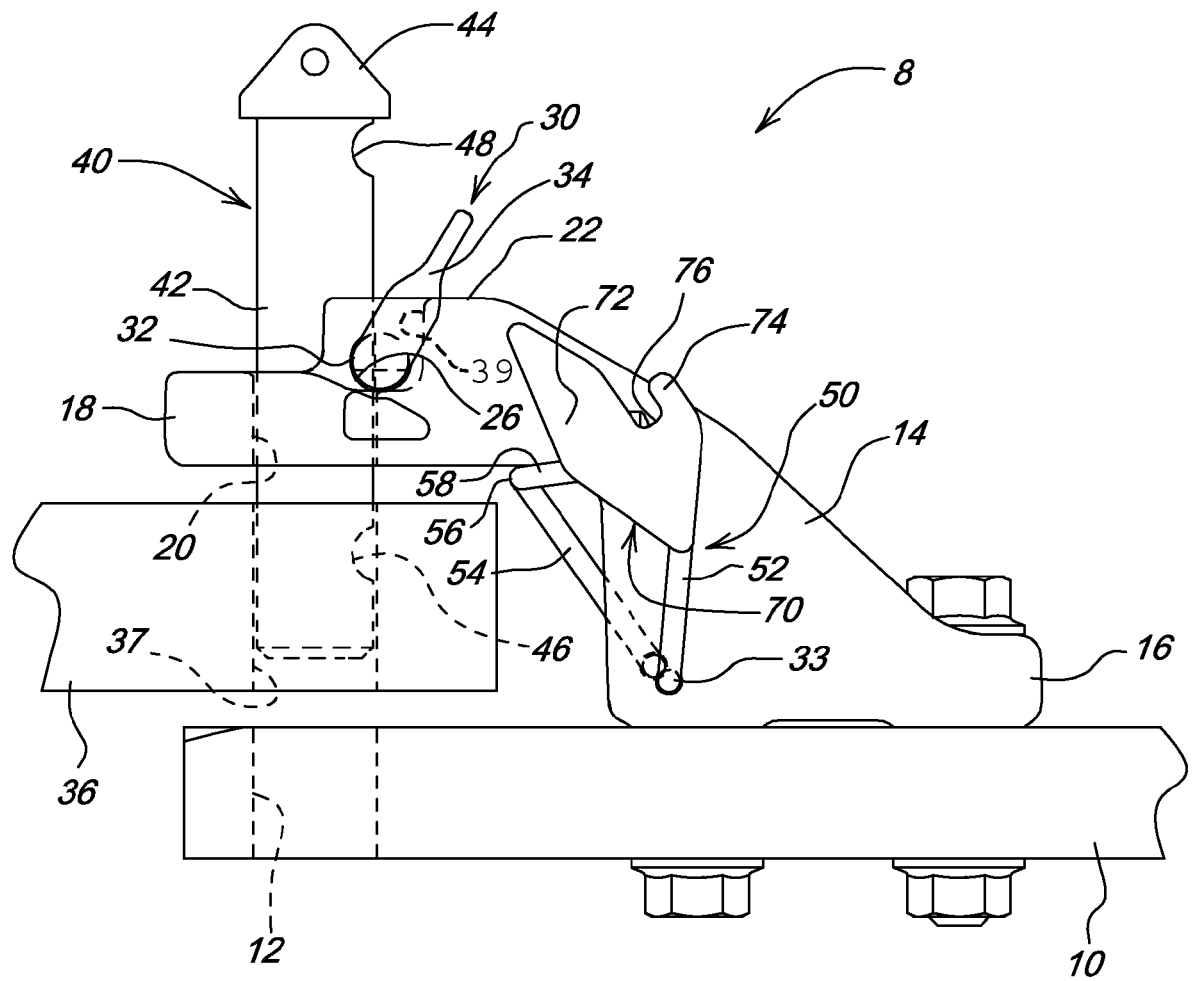
FIG. 2 is a left side view of the drawbar hammer strap assembly of FIG. 1 showing the implement trigger pivoted over-center into its unlatched position.

Referring to FIGS. 1-4, a drawbar hammer strap assembly or unit 8 includes a vehicle drawbar 10 which has a bore 12 extending vertically therethrough. A hammer strap 14 is attached to the drawbar 10 near its aft end. The hammer strap 14 includes a body 15 which extends upwardly and rearwardly from a base 16 to a rear upper part 18. Part 18 includes a vertically extending bore 20 which is aligned with bore 12. Upper part 18 also forms a pair of cross pin retainer members 22 and 24 through which cross pin bores 26 and 28 extend. Bores 26 and 28 receive the shaft 32 of cross pin 30.

Cross pin 30 also includes a lever arm 34 which projects from an end of shaft 32. The cross pin 30 cooperates in a known manner with grooves in the drawbar pin 40 to releasable hold the drawbar pin 40 mounted in the bores 12 and 20, as described in U.S. Pat. No. 6,758,486. The weight of the drawbar pin 40 acts on the cross pin 30 to prevent it from accidentally rotating to its drawbar pin releasing position.

Figure 3:
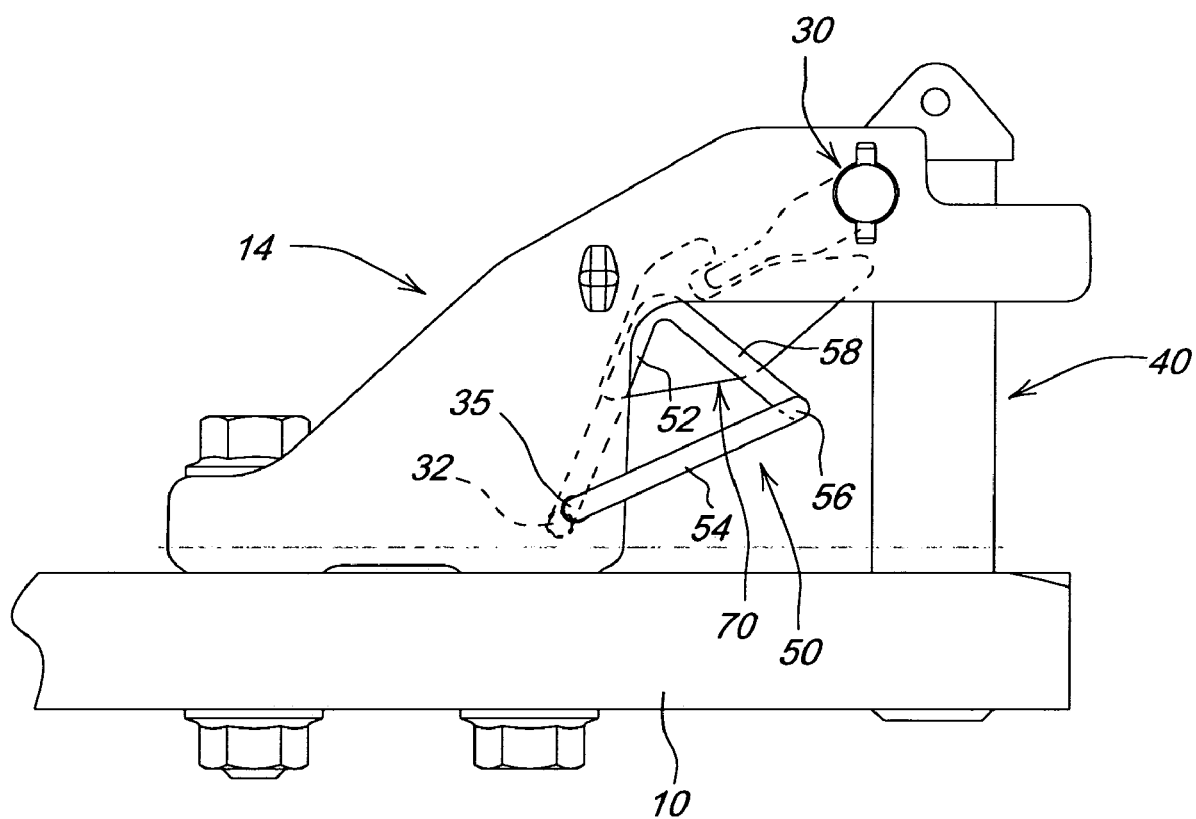
FIG. 3 is a right side view of the drawbar hammer strap assembly.
Figure 4:
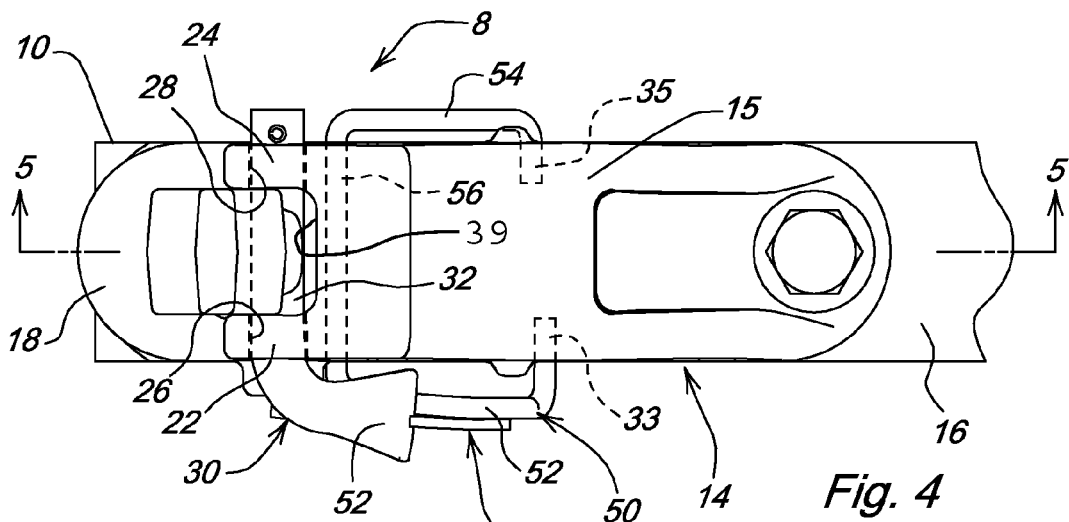
FIG. 4 is a top view of the drawbar hammer strap assembly.

A pair of mis-aligned laterally-extending trigger bores 33 and 35 are formed in opposite sides of the hammer strap 14 in or near a rear portion of its base 16. As best seen in FIG. 3, bores 33 and 35 are spaced apart in the vertical direction with bore 33 above bore 35, and are spaced apart in the fore-aft direction with bore 33 to the rear of bore 35.

As best seen in FIGS. 1, 2, 4 and 5, the top of the hammer strap 14 forms a rectangular recess 39 which receives the square head 44 and thus prevents rotation of the drawbar pin 40.

Hammer strap assembly 8 is adapted to receive and be coupled to an implement tongue 36 which has a vertical bore 37. By means of a drawbar pin 40. The drawbar pin 40 is mountable through bores 12, 20 and 37. Drawbar pin 40 includes a shaft 42 and a head 44 attached to and upper end of shaft 42. A handle (not shown) is pivotally coupled to the head 44 of drawbar pin 40. An lower groove or recess 46 and an upper groove or recess 48 extend horizontally across the surface of the shaft 42.

Figure 6:
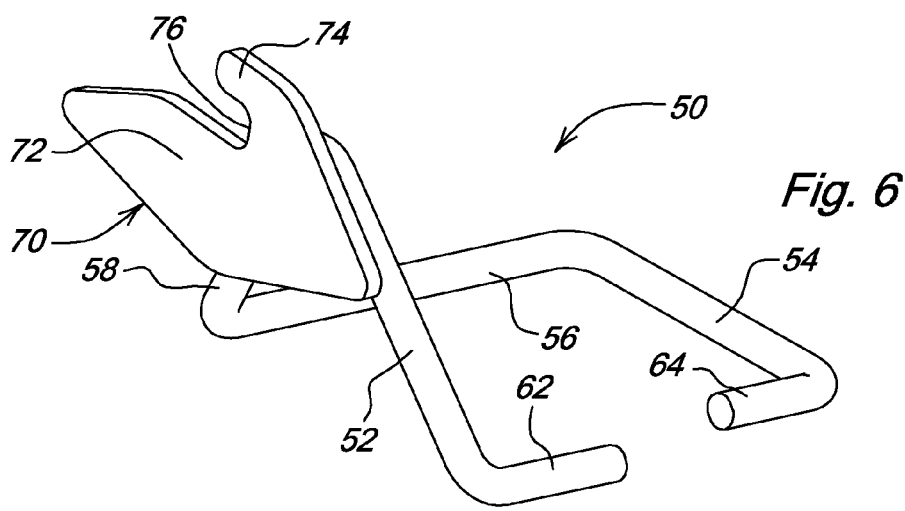
FIG. 6 is a perspective view of the trigger removed from the drawbar hammer strap assembly.

A trigger 50 is mounted on and coupled to the hammer strap 14. The trigger 50 includes a latch member 70 which is engagable with lever arm 34 and which and engagable with an end of the tongue 36. Trigger 50 also includes a first leg 52 pivotally coupled to a first side of the hammer strap 14, a second leg 54 pivotally coupled to a second side of the hammer strap 14, a cross piece 56 connected to the second leg 54, and a third leg 58 connecting the cross piece 56 to the first leg 52. Legs 52 and 54 have ends 62 and 64 which are bent at right angles and which are received in bores 33 and 35, respectively. Preferably, the trigger 50 is formed by bending a single piece of flexible wire or rod into the shape shown in FIG. 6.

A latch member 70 is attached to legs 52 and 58. Latch member 70 is preferably formed of sheet metal and is welded to legs 52 and 58. As best seen in FIG. 1, latch member 70 includes a main body 72 and a finger 74 separated by a slot 76. Slot 74 releasably receives the end of lever arm 34.

Figure 5:
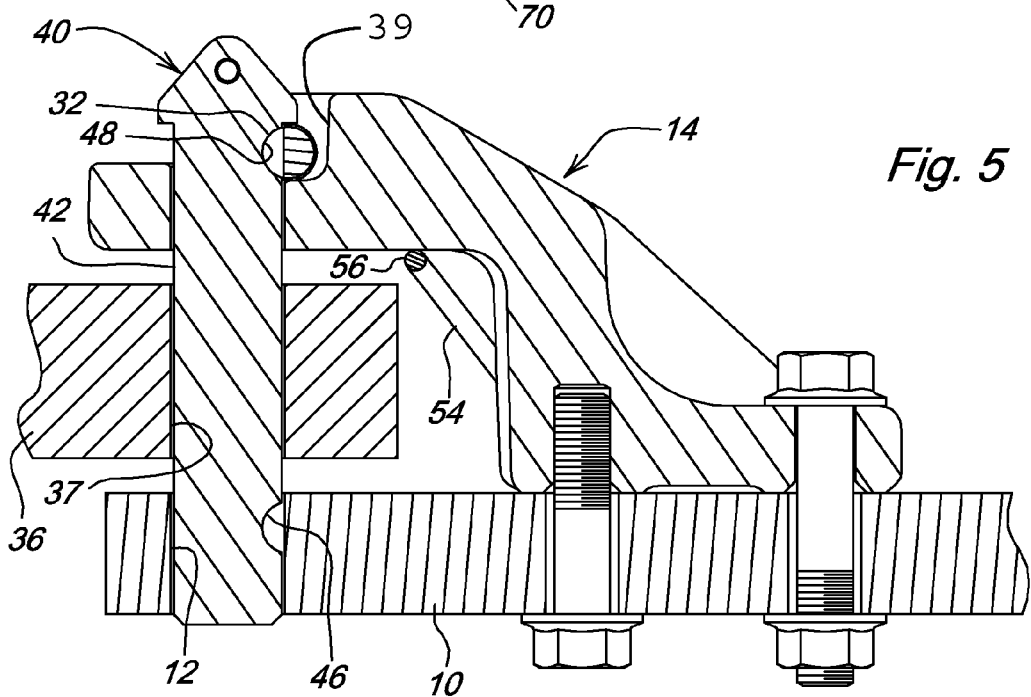
FIG. 5 is a sectional view along lines 5-5 of FIG. 4.

As best seen in FIG. 5, the shaft 32 of cross pin 30 has a recess 33 formed on one side thereof. The recess 33 cooperates with the grooves 46 and 48 of drawbar pin 40 so that the cross pin 30 can be manipulated to hold drawbar pin 40 in either of two positions or released to be moved upwards or downwards. Cross pin 30 prevents rotation of the drawbar pin 40 when it is received by grooves 46 and 48.

Mode of Operation

Referring now to FIG. 1, before the assembly 10 is coupled to an implement tongue 36, the drawbar pin 40 will be held in its raised position by cross pin 30. The trigger 50 is pushed down so that slot 74 releasably receives the end of lever arm 34 and latch member 70 prevents cross pin 30 from rotating while taking no vertical or rotational load from the drawbar pin 40. As the drawbar hammer strap assembly 8 is moved to the left (or the tongue 36 moved to the right), the tongue 36 will engage the latch member 70 of trigger 50 and pivot the latch member 70 clockwise viewing FIG. 1, and the body 72 will flip lever arm 34 counter-clockwise. After the trigger 50 pivots a certain amount, its over-center coupling via bores 33 and 35 will cause trigger 50 to snap into the unlatched position shown in FIG. 2, wherein latch member 70 is moved away from cross pin lever 34. and a portion (cross piece 56) of the trigger 50 is biased into engagement with a lower surface of the hammer Strap 14. This allows cross pin 30 to pivot counterclockwise to the position shown in FIG. 2, which in turn, allows drawbar pin 40 to descend into bores 37 and 12 as shown in FIGS. 3 and 5.

This design provides adequate vertical and rotational resistance for the drawbar pin, and also provides a trigger mechanism to allow the drawbar pin to drop into the implement tongue while the operator remains in the operator seat.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A vehicle drawbar hammer strap assembly comprising:
  a vehicle drawbar;
  a hammer strap member attached to the vehicle drawbar, the vehicle drawbar and the hammer strap member being adapted to receive an implement tongue;
  a drawbar pin mountable to the vehicle drawbar and hammer strap member;
  a cross pin rotatably mounted in the hammer strap for operable engagement with the drawbar pin to releasably hold the drawbar pin in a mounted position, the cross pin having a lever arm manipulatable to rotate the cross pin to an unlocked position permitting insertion of the drawbar pin and to a locked position preventing movement of the drawbar pin; and
  a trigger pivotally coupled to the hammer strap member, the trigger being engagable with the tongue and the cross pin, the trigger being pivotal from a latched position wherein it engages the cross pin and holds the cross pin in its locked position to an unlatched position wherein it is spaced apart from the cross pin, insertion of the tongue into a space between the vehicle drawbar and the hammer strap causing the tongue to engage the trigger and pivot the trigger from its latched to its unlatched position.

2. The drawbar hammer strap assembly of claim 1, wherein the trigger comprises:
  a latch member having a body and a finger engagable with lever arm, the body being engagable with an end of the tongue;
  a first leg coupled to the latch member and pivotally coupled to a first side of the hammer strap;
  a second leg coupled to the latch member and pivotally coupled to a second side of the hammer strap.

3. The drawbar hammer strap assembly of claim 2, wherein:
  the trigger further comprises a cross piece connected to the second leg, and a third leg connecting cross piece to the first leg, said legs being formed from a single piece of flexible wire.

4. The drawbar hammer strap assembly of claim 1, wherein:
  the trigger is coupled to the hammer strap in an over-center manner so that it snaps into its unlatched position when pivoted a certain amount by the tongue.

5. The drawbar hammer strap assembly of claim 1, wherein:
  a portion of the trigger is biased into engagement with a surface of the hammer strap when the trigger is in its unlatched position.

6. The drawbar hammer strap assembly of claim 1, further comprising:
  first and second trigger mounting bores extending into opposite sides of the hammer strap; and
  the trigger includes a pair of ends, each end received by a respective one of the mounting bores.

7. The drawbar hammer strap assembly of claim 6, wherein:
  the first and second trigger mounting bores are mis-aligned with respect to each other.

8. The drawbar hammer strap assembly of claim 6, wherein:
  the first mounting bore has an axis which is below an axis of the second trigger mounting bore.

9. The drawbar hammer strap assembly of claim 1, wherein the trigger comprises:
  a latch member having a body and a finger engagable with lever arm, the body being engagable with an end of the tongue; and
  a wire frame member attached to the latch member and pivotally coupled to the hammer strap.

10. The drawbar hammer strap assembly of claim 1, wherein the trigger comprises:
  a latch member having a body and a finger separated by a slot, the slot releasably receiving an end of the lever arm, the body being engagable with an end of the tongue and with the lever arm; and
  a wire frame member attached to the latch member and pivotally coupled to the hammer strap.

11. A drawbar hammer strap assembly comprising:
  a drawbar hammer strap unit for attachment to a vehicle and being adapted to receive an implement tongue;
  a drawbar pin mountable to the drawbar hammer strap unit;
  a cross pin rotatably mounted in the drawbar hammer strap unit for operable engagement with the drawbar pin to releasably hold the drawbar pin in a mounted position, the cross pin having a lever arm manipulatable to rotate the cross pin to an unlocked position permitting insertion of the drawbar pin and to a locked position preventing movement of the drawbar pin; and and
  a latch member pivotally coupled to the drawbar hammer strap unit, the latch member having a first part for engaging the cross pin and having a second part engagable with the tongue, the latch member being pivotal from a latched position wherein the first part engages the cross pin and holds the cross pin in its locked position to an unlatched position wherein the first part is spaced apart from the cross pin to permit the cross pin to rotate to its unlocked position, insertion of the tongue into drawbar hammer strap unit causing the tongue to engage the second part and pivot the latch member from its latched to its unlatched position.

12. The drawbar hammer strap assembly of claim 11, wherein the latch member comprises:
   a tab engagable with the lever arm;
   a cross piece coupled to the tab and engagable with an end of the tongue;
   a first leg projecting from the tab and pivotally coupled to a first side of the hammer strap;
   a second leg projecting from the cross piece and pivotally coupled to a second side of the hammer strap; and
   a third leg connecting the tab to the cross piece.

13. The drawbar hammer strap assembly of claim 11, further comprising:
   first and second mounting bores extending into opposite sides of the drawbar hammer strap unit; and
   the latch member comprises a tab engagable with the lever arm, a cross piece coupled to the tab and engagable with an end of the tongue, a first leg projecting from the tab and pivotally coupled to a first side of the hammer strap, a second leg projecting from the cross piece and pivotally coupled to a second side of the hammer strap, and a third leg connecting the tab to the cross piece, the first and second legs having ends, each end being received by a respective one of the mounting bores.

14. The drawbar hammer strap assembly of claim 13, wherein:
   the first and second mounting bores are mis-aligned with respect to each other.

* * * * *